United States Patent
Kumar et al.

(10) Patent No.: US 9,494,707 B2
(45) Date of Patent: Nov. 15, 2016

(54) SLABBED CORE FORMAT FOR BOREHOLE IMAGE DATA

(71) Applicant: Schlumberger Technology Corporation, Sugar Land, TX (US)

(72) Inventors: Anish Kumar, Katy, TX (US); Florent Bringer, Quito (EC); George Richard Kear, Conway, AR (US); Cormac Parsons, Jacou (FR); Florent d'Halluin, Grabels (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/366,684

(22) PCT Filed: Dec. 31, 2012

(86) PCT No.: PCT/US2012/072258
§ 371 (c)(1),
(2) Date: Jun. 19, 2014

(87) PCT Pub. No.: WO2013/102185
PCT Pub. Date: Jul. 4, 2013

(65) Prior Publication Data
US 2015/0003688 A1    Jan. 1, 2015

Related U.S. Application Data

(63) Continuation of application No. 13/727,971, filed on Dec. 27, 2012, now abandoned.

(60) Provisional application No. 61/581,208, filed on Dec. 29, 2011.

(51) Int. Cl.
G06K 9/00 (2006.01)
G01V 3/18 (2006.01)
E21B 47/022 (2012.01)
G06T 11/20 (2006.01)
G06T 3/00 (2006.01)

(52) U.S. Cl.
CPC ............... *G01V 3/18* (2013.01); *E21B 47/022* (2013.01); *G06K 9/00624* (2013.01); *G06T 3/0031* (2013.01); *G06T 11/203* (2013.01); *G06T 11/206* (2013.01)

(58) Field of Classification Search
None
See application file for complete search history.

(56) References Cited

U.S. PATENT DOCUMENTS 5,277,062 A    1/1994  Blauch et al.
7,636,204 B1 * 12/2009  Bourget ........................ 359/726
(Continued)

FOREIGN PATENT DOCUMENTS

EP    0211683    10/1993

OTHER PUBLICATIONS

Examination report for the equivalent Australian patent application No. 2012362182 issued on Jun. 17, 2015.
Partial Supplementary European Search Report issued in corresponding EP Application No. 12861165.4 mailed Oct. 21, 2015.
(Continued)

*Primary Examiner* — Tahmina Ansari

(57) ABSTRACT

A method can include providing borehole data organized with respect to a cylindrical surface, defining one or more bedding planes based at least in part on the borehole data, and transforming at least a portion of the borehole data to a planar slab format for a plane interior to the cylindrical surface. Various other apparatuses, systems, methods, etc., are also disclosed.

19 Claims, 13 Drawing Sheets

(56) References Cited

U.S. PATENT DOCUMENTS

| | | | |
|---|---|---|---|
| 2003/0117895 A1* | 6/2003 | Brandsaeter | 367/81 |
| 2005/0192753 A1 | 9/2005 | Wang et al. | |
| 2006/0056730 A1* | 3/2006 | Matsumoto | 382/285 |
| 2006/0235666 A1* | 10/2006 | Assa et al. | 703/10 |
| 2009/0235729 A1 | 9/2009 | Barthelemy et al. | |
| 2010/0150406 A1* | 6/2010 | Xiao et al. | 382/118 |
| 2011/0064277 A1* | 3/2011 | Duncan et al. | 382/109 |
| 2013/0170713 A1* | 7/2013 | Kumar et al. | 382/109 |

OTHER PUBLICATIONS

Walls et al., "Digital Rock Physics Reveals Link between Reservoir Quality and Pore Type in Eagle Ford Shale", Search and Discovery Article #40785, Aug. 8, 2011, pp. 1-18.

Walls et al., "Relationship of shale porosity-permeability trends to pore type and organic content", Denver Well Logging Society, Proceedings of the 2011 Fall Workshop "Petrophysics in Tight Oil", Denver, CO, Oct. 26, 2011, pp. 1-12.

* cited by examiner

SLABBED CORE FORMAT FOR BOREHOLE IMAGE DATA

BACKGROUND

Borehole tools can acquire subsurface data to aid locating and mapping of boundaries (e.g., bed boundaries) between layers of material, such as rock beds, and, for example, to visualize and orient fractures and faults.

A borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Raw data can include multiple electrode readings, caliper readings from individual pads or pairs of pads, and x-, y-, and z-axis accelerometer and magnetometer readings. Borehole deviation and a first pad (e.g., pad 1 for the tool) orientation can be determined from magnetometers. A sample rate for electrode and accelerometer data can be on the order of about 120 samples/ft (400 samples/m).

Areal coverage of a borehole face can be a function of width of electrode arrays, number of pads, borehole diameter, etc. As an example, about 40 percent to about 80 percent of a borehole face may be imaged. Where data is not collected, so-called "non-imaged parts", raw data may be separated by blank "strips" (e.g., between adjacent pads on a resulting borehole log).

Processing of current data sensed remotely in response to delivery of current in a borehole can provide a map of resistivity of a rock-fluid system at the borehole face (e.g., cylindrical borehole surface). For viewing borehole data, a line may be defined along a "true north" direction along which the "cylindrical" data is "split" between top and bottom and unrolled to provide a 2-D view. The line along which the "cylinder" is "split" may be any other geographical direction or may be the "Top of hole" or other such orientation.

For a boundary, if planar and at a non-orthogonal angle to the axis of the cylinder, the intersection between the boundary and a cylindrical borehole is an ellipse (e.g., in an extreme case, a plane that is exactly perpendicular to the axis of a cylinder would give an exact circle). Upon unrolling the cylindrical image of the borehole surface image, this oval is "cut" and open up as one cycle of a sinusoidal curve. Because the sinusoidal curve is part of an oriented image, every part of it corresponds to an orientation, and the lowermost part of the curve indicates the apparent dip (slope) azimuth (direction). The amplitude of the sinusoidal curve corresponds to a dip angle relative to the borehole, for example, where the greater the amplitude, the greater the dip angle relative to the borehole. On the other hand, in an extreme case, where the amplitude becomes zero, (i.e., a plane that is exactly perpendicular to the axis of a cylinder), the plane would appear as a straight line in an unrolled 2-D view.

Processing can include creating a series of borehole images where color maps are applied to different bins or ranges of resistivity values (e.g., for a tool that provides resistivity values). In the borehole image, color pixels can be arranged in their proper geometric position representing a borehole surface. One convention provides that low-resistivity features, such as shales or conductive minerals or conductive fluid-filled fractures or pore spaces, are displayed as dark colors; whereas, high-resistivity features, such as hydrocarbon-filled or well-cemented sandstones and limestones, are displayed as shades of yellow, and white—the higher the resistivity the brighter the image. As to a gray scale convention, black may correspond to low resistivity and white to high resistivity.

Processed borehole images may be of a static type or a dynamic type. Static images are those which have had one contrast setting applied to the entire borehole, which can provide useful views of relative changes in material resistivity. Dynamic images, which have had variable contrast applied in a moving window, can provide enhanced views of features such as vugs, fractures, and bed boundaries. Dynamic images tend to be better at bringing out subtle features in rocks that have very low resistivities, such as shales, and very high resistivities, such as carbonates and crystalline rocks or in any rocks with low relative contrast between the beds and other features.

Described herein are various examples of technologies and techniques that may transform borehole data.

SUMMARY

A method can include providing borehole data organized with respect to a cylindrical surface, defining one or more bedding planes based at least in part on the borehole data, and transforming at least a portion of the borehole data to a planar slab format for a plane interior to the cylindrical surface. A system can include an interface to receive borehole data organized with respect to a cylindrical surface, a graphical user interface to align a sinusoidal graphic with respect to an image of the borehole data, circuitry to project at least a portion of the borehole data to a plane interior to the cylindrical surface and circuitry to render a 2-D image of the plane that includes bedding planes derived from alignment of the sinusoidal graphic and projected borehole data. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
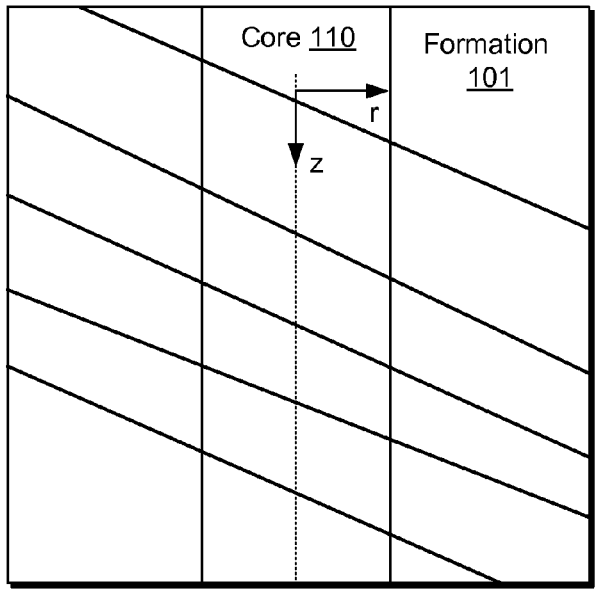
FIG. 1 illustrates an example of a process along with graphical representations of a solid core sample.
Figure 1:
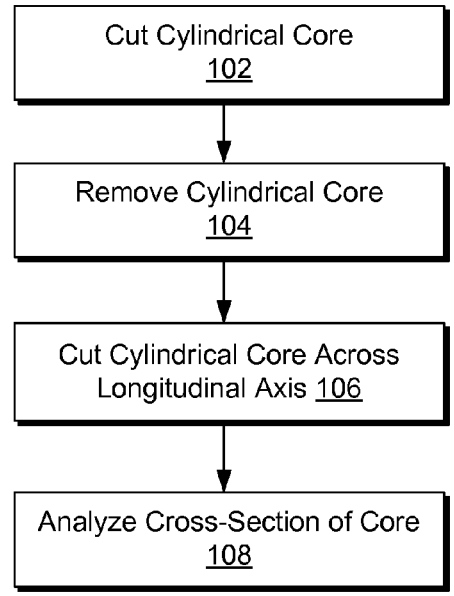
Figure 1:
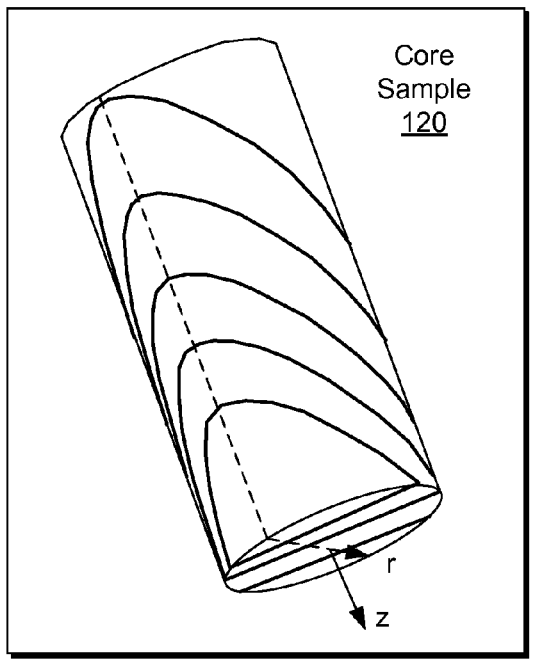
Figure 1:
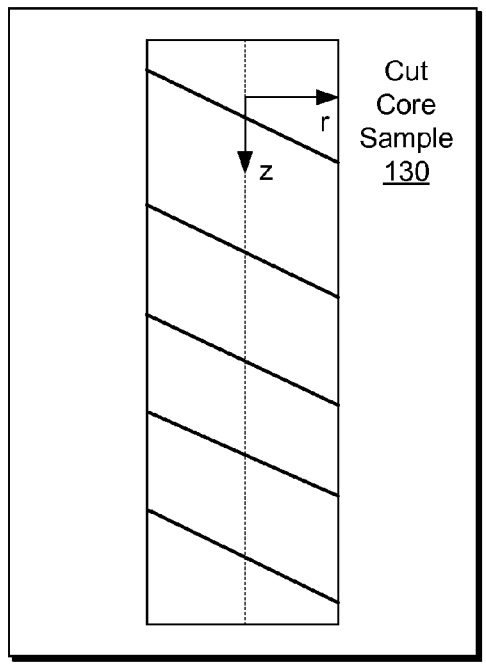

FIG. 1 shows an example of a process 100 along with graphical representations of a solid core sample 120 from the subsurface formation 101. The process includes cutting a cylindrical core 102 (e.g., typically accomplished using a hollow drilling bit and assembly), removing the solid cylindrical core 104, cutting (e.g., "slabbing") the cylindrical core parallel to the longitudinal axis 106 to expose a planar surface of the core and analyzing the planar cross-section of the core 108. As shown in FIG. 1, the core sample 120 is a solid cylinder such that cutting provides a solid cross-section 130 (e.g., known as a "core slab") of the solid cylinder core sample 120.

Figure 2:
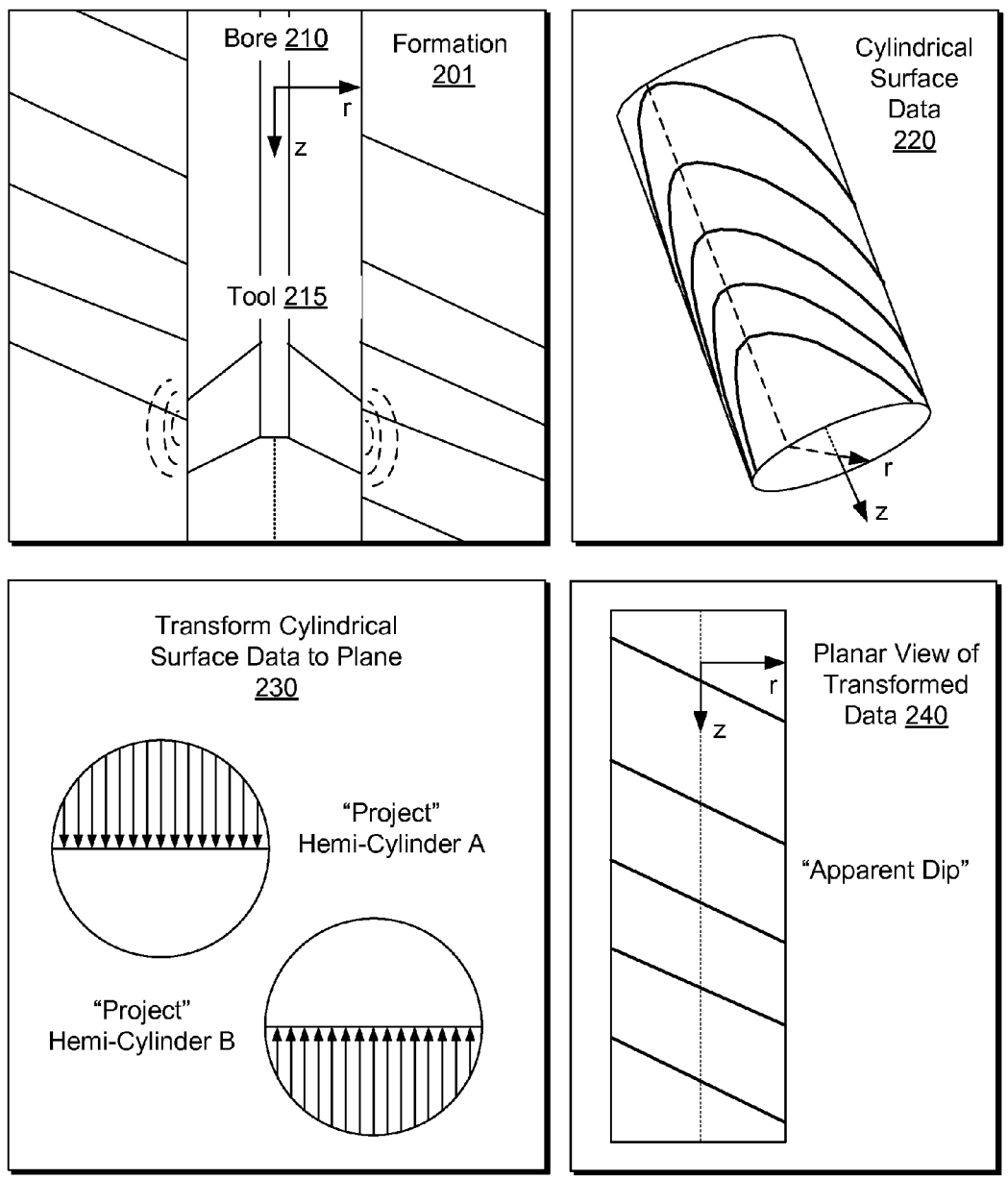
FIG. 2 illustrates an example of a process along with graphical representations of data processing.

FIG. 2 shows an example of a process 200. The process 200 includes providing a borehole 210 in a formation 201 (e.g., via drilling) and inserting a tool 215 in the borehole 210 to acquire data, for example, petrophysical, geological, etc. (e.g., data having at least some petrophysical or geological relevance). As shown in the example of FIG. 2, at least a portion of the data acquired is an electrical (or other petrophysical parameter) image of the formations and features present at the borehole and may be referred to as cylindrical surface data 220. As an example, an image may be a circumferential image where data are organized about a circumference, which may correspond to a circumference of a borehole, at a radial distance beyond a surface of a borehole, etc. (e.g., depending on technique implemented for data acquisition). For example, a visual image may be of a surface of a borehole while a gamma radiation "image" may represent information stemming from emission of gamma radiation within rock adjacent to the surface of a borehole.

While in the example of FIG. 2, the cylinder 220 is a hollow cylinder composed of the data of the surface of the borehole, the process 200 may transform cylindrical surface data 220 or other cylindrical data from material adjacent to a surface via one or more transformation techniques 230 to provide a planar view of transformed data 240. As an example, cylindrical data may be sparse, for example, depending on acquisition equipment, technique, etc. and, where data are sparse, interpolation may be applied to form a fuller data set (e.g., to fill in a data set with interpolated values).

In the example of FIG. 2, or various other examples, data may be one or more of FMI data, density based data, acoustic data (e.g., ultrasound data), gamma ray data, etc. As an example, data may be acquired during a drilling process and optionally analyzed in near-real-time, which may provide feedback for controlling the drilling process. As an example, data may be acquired during a drilling process or after a drilling process and thereafter analyzed.

As shown, the cylindrical surface data 220 may be "cut" to provide two hemi-cylindrical surfaces where data for one or both of these surfaces may be transformed to a planar surface. Along with the borehole deviation, the azimuthal direction of the "cut" (e.g., a selected plane parallel to a hole axis passing through the cylindrical surface data) may determine whether the planar view of the transformed data 240 illustrates true dip or apparent dip for planes of the formation 201. The azimuthal direction is explained with respect to FIG. 3 (see, e.g., the convention 315) and a particular convention that uses directions north, east, south and west, which may be given in angles, for example, 0 degrees, 90 degrees, 180 degrees, 270 degrees, and 360 degrees respectively.

Various examples described herein pertain to petrophysical data. In general, "petra" or "petro" refers to rock or other material (e.g., subsurface material). A process may optionally be applied to other situations where a borehole is made and cylindrical surface data acquired. As an example, consider a bore made into a tree where "growth rings" intersect the borehole (e.g., as in the field of dendrochronology). In such an example, one or more growth rings or other features may be handled akin to a bedding plane (e.g., or other appropriate manner, which may account for curvature, etc.). Such an analysis may provide information as to climate (e.g., weather, rain, temperature, soil pH, plant nutrition, $CO_2$ concentration, etc.) for different years, which may infer climate variations. Other information such as fire, insect, volcanic activity, earthquake, etc., may possibly be derived as well.

Figure 3:
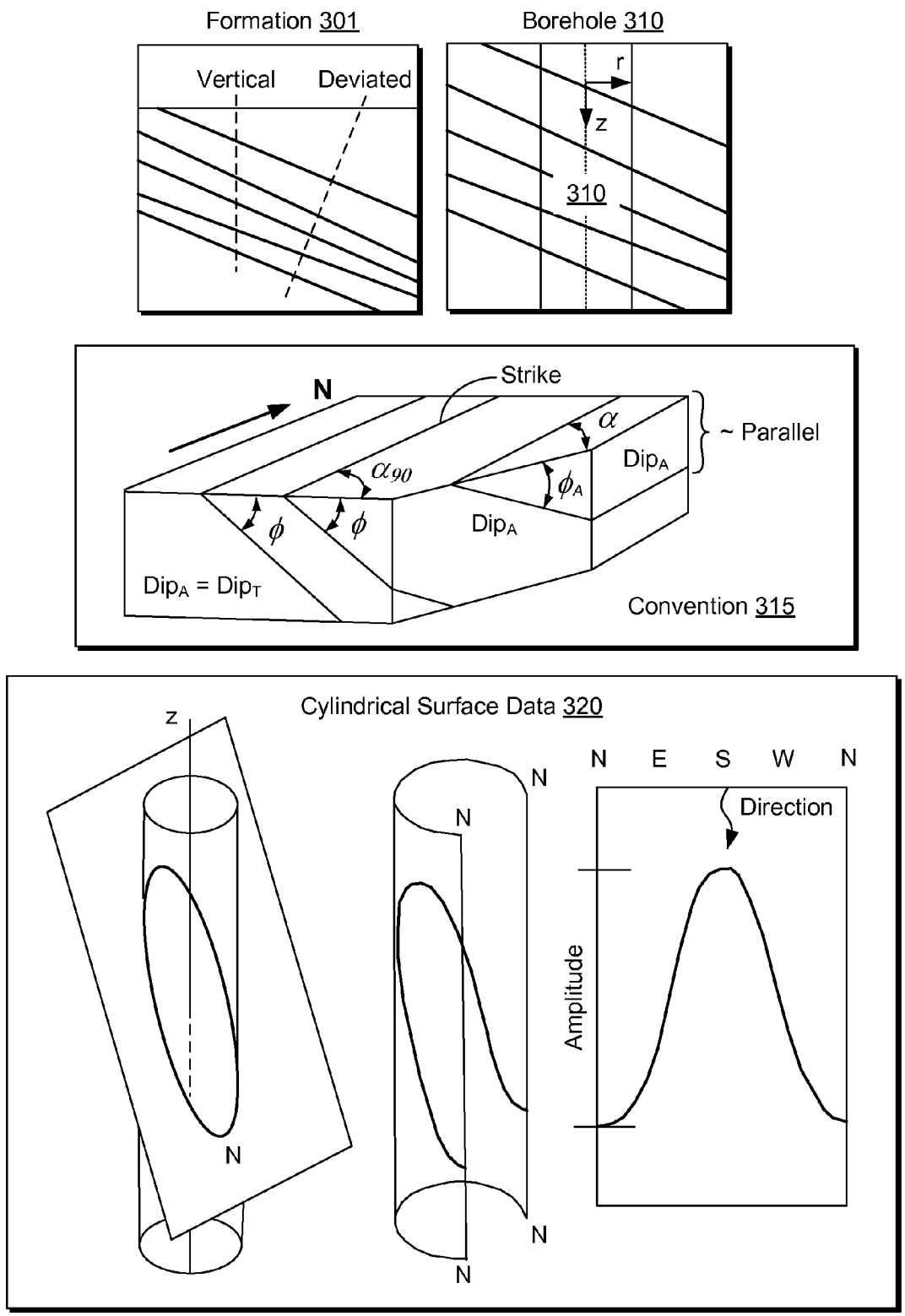
FIG. 3 illustrates an example of a formation, an example of a borehole, an example of a convention, and an example of cylindrical surface data.

FIG. 3 shows an example of a formation 301, an example of a borehole 310, a convention 315 for dip and an example of cylindrical surface data 320 for a plane passing through a cylinder. As shown, the formation 301 includes a horizontal surface and various subsurface layers. As an example, a borehole may be vertical. As another example, a borehole may be deviated. In the example of FIG. 3, the borehole 310 may be considered a vertical borehole, for example, where the z-axis extends downwardly normal to the horizontal surface of the formation 301.

As to the convention 315 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 315 of FIG. 3, various angles φ indicate angle of slope downwards, for example, from an imaginary horizontal plane (e.g., flat upper surface); whereas, azimuth refers to the direction towards which a dipping plane slopes (e.g., which may be given with respect to degrees, compass directions, etc.). Another feature shown in the convention of FIG. 3 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 315 of FIG. 3). True dip is the dip of a plane measured exactly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 315 of FIG. 3). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 315 of FIG. 3, the dip of a plane as seen in a cross-section exactly perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 315 of FIG. 3, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. The resulting dips from such a process are called relative dips and find use in interpreting sand body orientation.

A convention such as the convention 315 may be used with respect to one or more analyses (see, e.g., the analysis block 108 of FIG. 1). As an example, various types of features may be described, in part, by dip (e.g., sedimentary bedding, faults and fractures, cuestas, igneous dikes and sills, metamorphic foliation, etc.).

An example of cylindrical surface data 320 is shown in FIG. 3 for a plane passing through a cylinder where the minimum (i.e., deepest measured depth point) coincides with the direction north (N). If the cylindrical surface data 320 is cut along a longitudinal line running from north downhole to north uphole, the cylindrical surface data may be presented in a 2-D format by "unrolling the cylinder". The image thus created is a representation of the plane's intersection with the cylinder displayed versus azimuthal direction or angle (e.g., 0 to 360 or N to E to S to W to N). In the "unrolled cylinder" 2-D format, the plane that intersects the cylinder appears as a sinusoidal curve. In the example of FIG. 3, the peak amplitude of this sinusoidal curve is at the direction south (S). Given the diameter of cylinder (e.g., or borehole), the sinusoidal curve may be characterized as having a distance (e.g., circumference) from north to east to south to west to north.

In the example of FIG. 3, any data indicative of material adjacent the borehole may likewise appear in a sinusoidal manner. Where multiple planes (e.g., bedding planes) intersect a borehole, the entire image may be composed of multiple sinusoids, which, for example, may or may not be parallel (e.g., consider non-parallel planes). Interpretation of data in a sinusoidal 2-D format may proceed in a manner different than that of a more common planar cross-section format (e.g., a core slab format) of a solid core sample (see, e.g., the cut core sample 130 of FIG. 1). Particularly, in an "unrolled cylinder" 2-D format planes may generally appear as sinusoid curves, whereas in "true" 2-D images (i.e., a core slab format), planes may generally appear as straight lines (see, e.g., the straight lines in the cut core sample 130 of FIG. 1). Users/interpreters may have decades of experience analyzing solid core samples in a core slab format, however, the applicability of such experience may be diminished when data are presented in a "unrolled cylinder" format, where planes may appear as sinusoids (e.g., data plotted in such a manner appears approximately sinusoid where the data represent planes).

Figure 4:
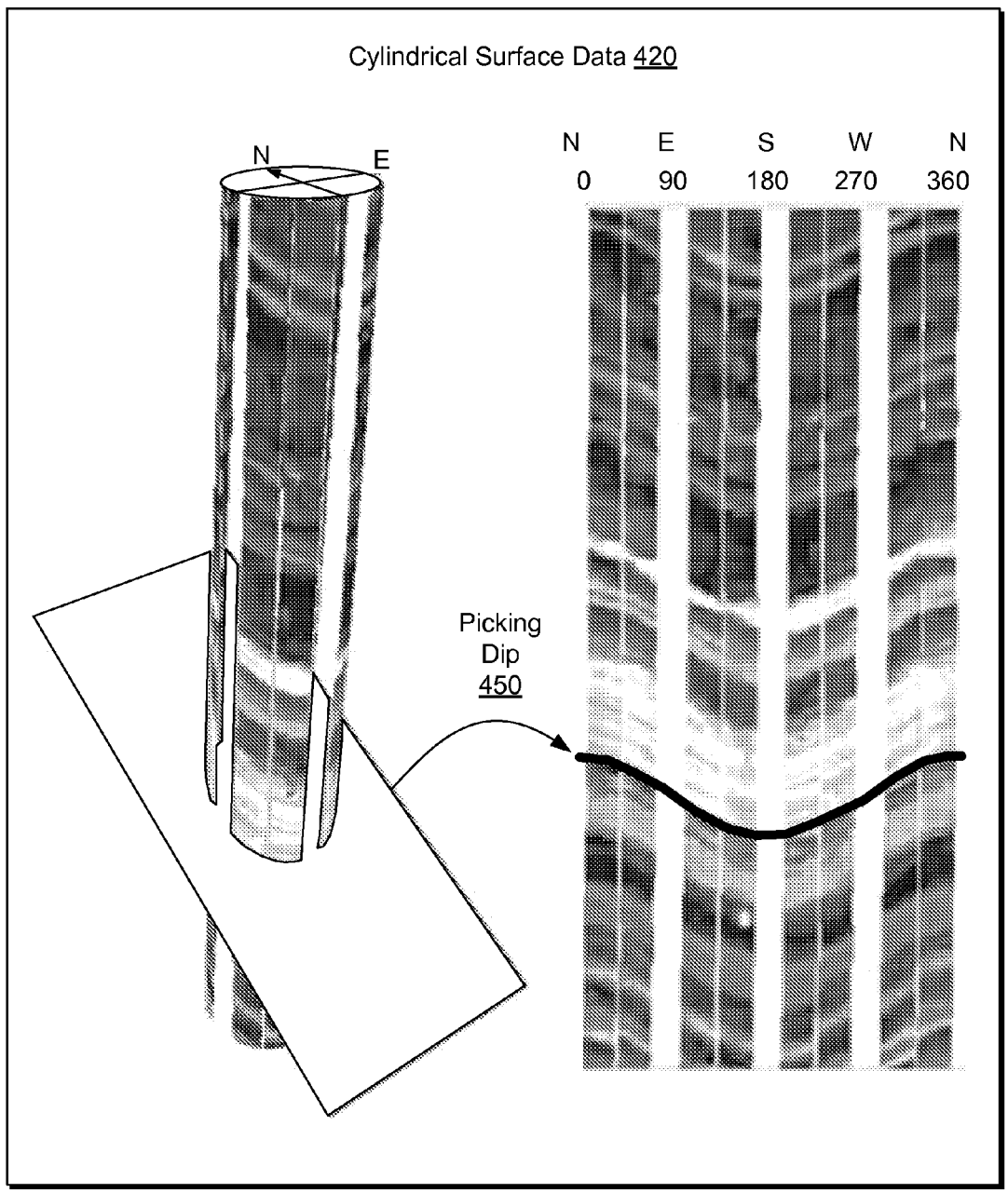
FIG. 4 illustrates an example of cylindrical surface data and an example of identifying one or more planes.

FIG. 4 (left side) shows an example of three-dimensional (3-D) cylindrical surface data 420 and a plane intersecting a cylinder corresponding to the data 420 where the plane may be a bedding plane. In a 2-D format (FIG. 4, right side), various materials (e.g., beds, fractures, or other planar features) are illustrated, and, as discussed above, being substantially planar, they tend to have a sinusoidal shape. In a process referred to as picking dips, the cylindrical surface data 420 may be presented on a display where a "sine" cursor tool allows a user to adjust amplitude, position along a z-axis, etc., of a sinusoidal curve to align it with the data for the stratified material. In particular, the sinusoidal curve may be positioned where image contrast (e.g., or other attribute) differs significantly, for example, to represent differences in resistivity or one or more other properties of the material. As an example, another way to achieve this is by clicking three or more times along the plane as seen on an image and letting a computing device mathematically connect the points using a sinusoid equation. While "sine" may be mentioned, a cosine or other appropriate function may be employed. Other methods also exist for dip identification.

As an example, a dip picking process may be implemented to determine dip (e.g., magnitude and azimuth) of one or more planes, and may be a part of a standard workflow when analyzing borehole data (e.g., borehole images). In the example of FIG. 4, the cylindrical surface data 420 is data observed at the cylindrical surface of the drilled borehole and, if viewed in three dimensions, is a hollow cylinder. However, once a plane is identified on this surface through analysis of the data 420 (e.g., by picking dip), that plane, an actual plane in 3-D space, can represent "absent" data that runs through the borehole (i.e., it transects the actual space within the hollow cylinder) and therefore can represent "absent" data that would have existed in the hollow of the cylinder.

Figure 5:
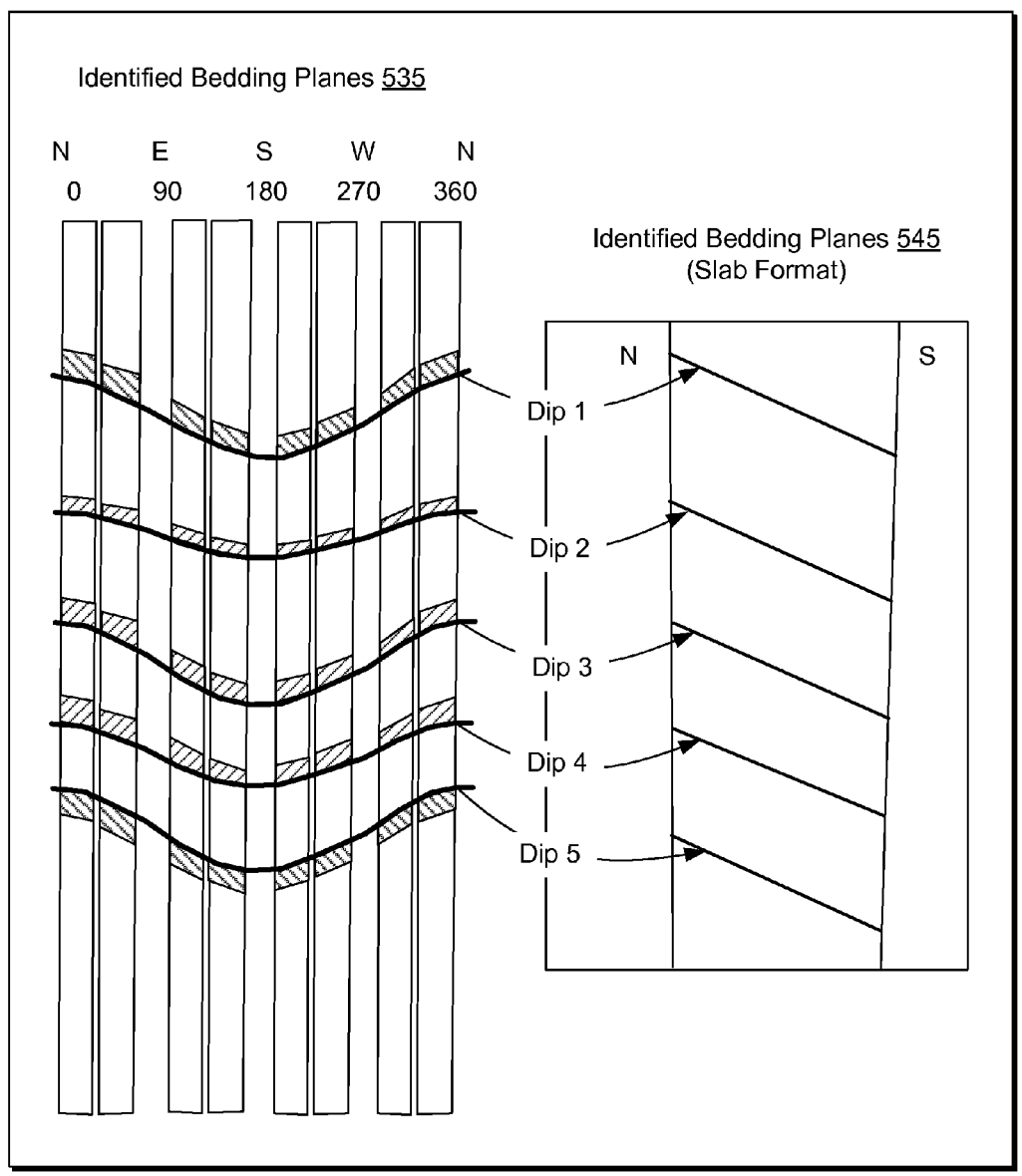
FIG. 5 illustrates an example of identifying a series of planes and representing the identified planes in a slab format.

FIG. 5 shows an example of identified bedding planes 535 as identified from a 2-D "unrolled cylinder" view of borehole cylindrical surface data. The sinusoidal characteristics including the apparent (e.g., with respect to a borehole angle) dip magnitude and azimuth of each of these planes (e.g., Dips 1 to 5) may be determined from use of a sinusoidal curve tool or another process. In the example of FIG. 5, the "picked" sinusoids each represent a plane in 3-D space. Collectively these planes represent data that runs through the borehole (i.e., they transect the actual space within the hollow cylinder). Because these planes completely transect the space of the cylinder, in a theoretical cross-section through the cylinder, these planes appear as straight lines derived from the intersection of the planes and the plane of cross-section.

The cross-section 545 of FIG. 5 may be a plane parallel to the longitudinal axis of the borehole, such that a rectangular view is obtained displaying the lines that represent the planes that transect the borehole that were "picked" from the cylindrical surface data 420 by "dip picking". This cross-section may be called a "true" 2-dimensional (2-D) section or a planar slab format 545. In the example of FIG. 5, the data that transects the borehole are boundary data of these "picked" planes as the interior data may be classified as "absent". As indicated in the example of FIG. 5, the process of identifying bedding planes 535 can provide information as to the dip (angle) of each of the planes at the respective depths. Accordingly, the planar slab format 545 does not include the data between various planes. In other words, in the example of FIG. 5, the slab format 545 shows a series of identified planes and their respective angles; it does not show data between planes, which, for example, may be useful in characterizing material lying between adjacent planes.

Figure 6:
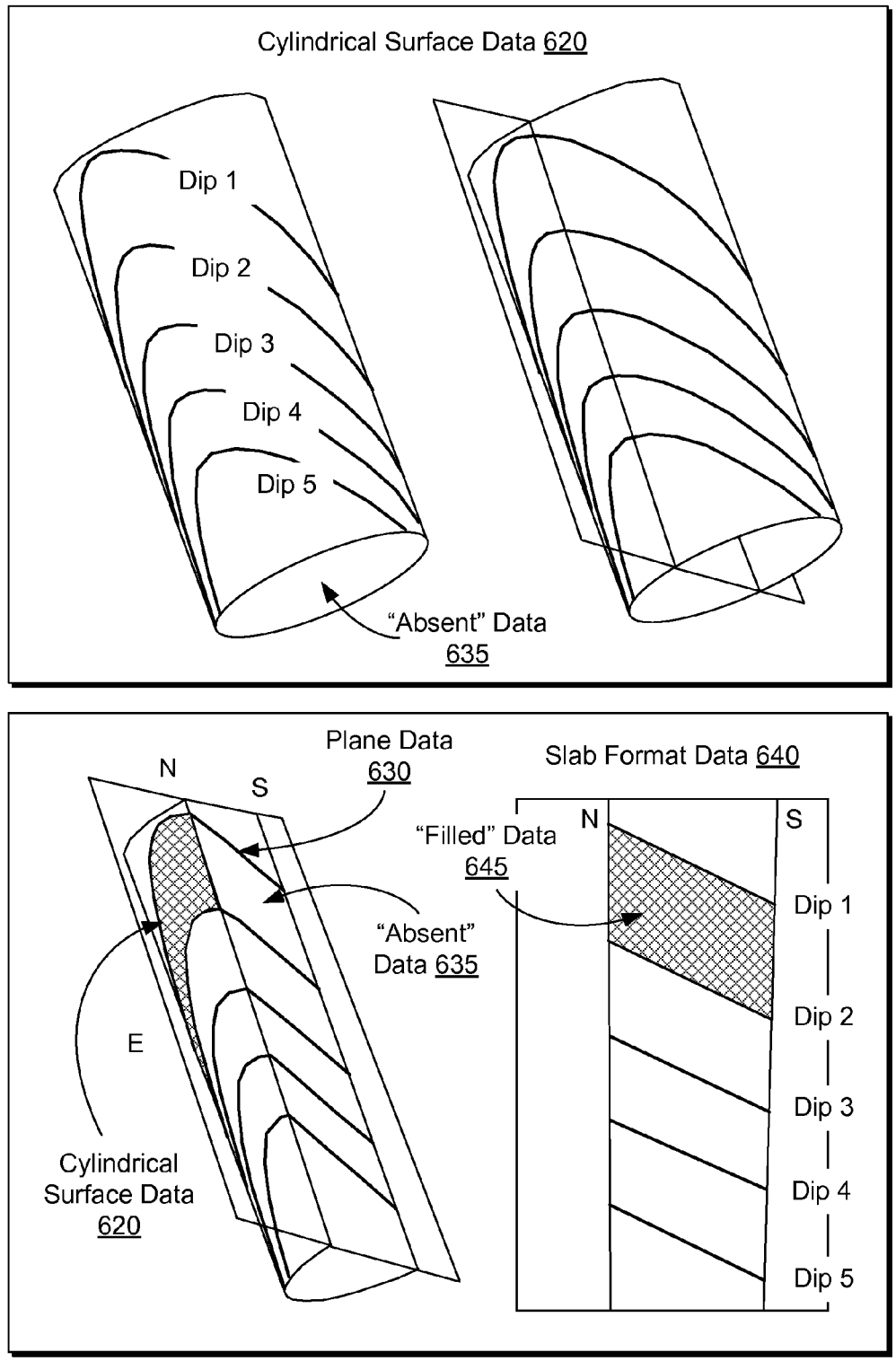
FIG. 6 illustrates an example of a process that includes filling data between two identified planes.

FIG. 6 shows an example of a process 600 that includes filling data between two identified planes (e.g., transforming data). The process 600 includes providing cylindrical surface data 620 (e.g., data organized with respect to a radius or diameter of a cylinder having a longitudinal axis). As indicated in FIG. 6, there are so-called "absent" data 635 for the interior space defined by the cylindrical surface. To "fill in" the "absent" data 635, the process 600 includes determining plane data 630 based at least in part on the cylindrical surface data 620 and filling in data (e.g., "filled" data 645) for a planar surface interior to the cylindrical surface based at least in part on the cylindrical surface data 620. As an example, in FIG. 6, a hatched portion of the cylindrical surface represents a portion of the surface data 620 that is transformed to fill in the hatched area between Dip 1 and Dip 2 in a slab format data 640.

Figure 7:
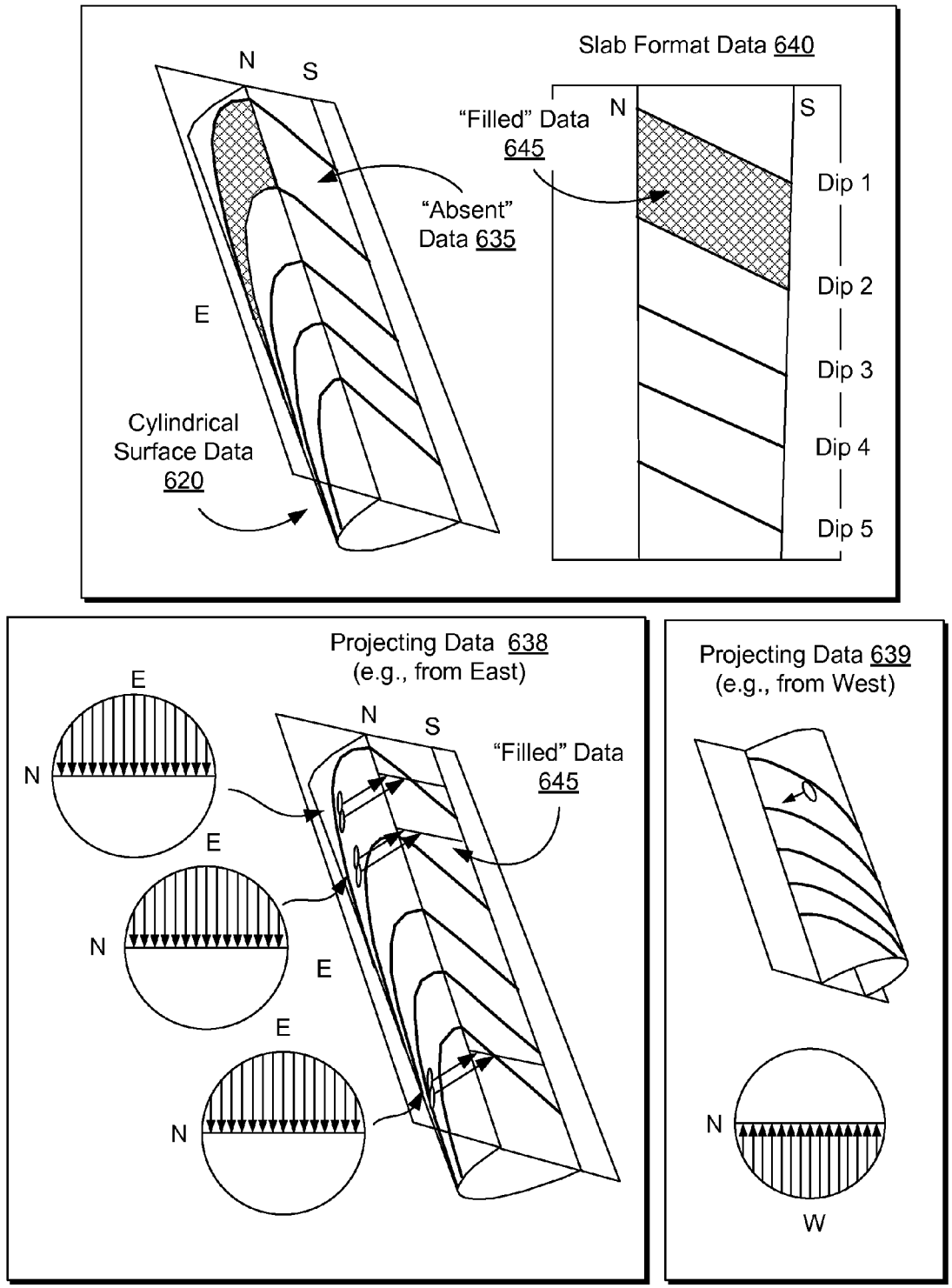
FIG. 7 illustrates an example of a process for filing data between various planes for a slab format.

FIG. 7 shows an example of how the process 600 may continue to fill in the "absent" data 635 to provide data in the slab format 640. In the example of FIG. 7, the process 600 includes projecting data 638 from a cylindrical surface to a planar surface. In the example of FIG. 7, the cylindrical surface data 620 is projected onto a plane to provide the filled data 645 of the slab format data 640 (e.g., which includes the plane data 630 and now the filled data 645 between the planes). The process of projecting data, or transforming data, may be performed using any of a variety of mathematical functions, algorithms, etc. Further, as mentioned with respect to the example of FIG. 2, projecting or transforming may be performed in any direction and optionally from two or more azimuthal directions. For example, in the FIG. 7, a projection may be performed from the east 638 and another from the west 639, optionally where averaging or sanity checking may occur to arrive at more reliable slab format data.

Figure 8:
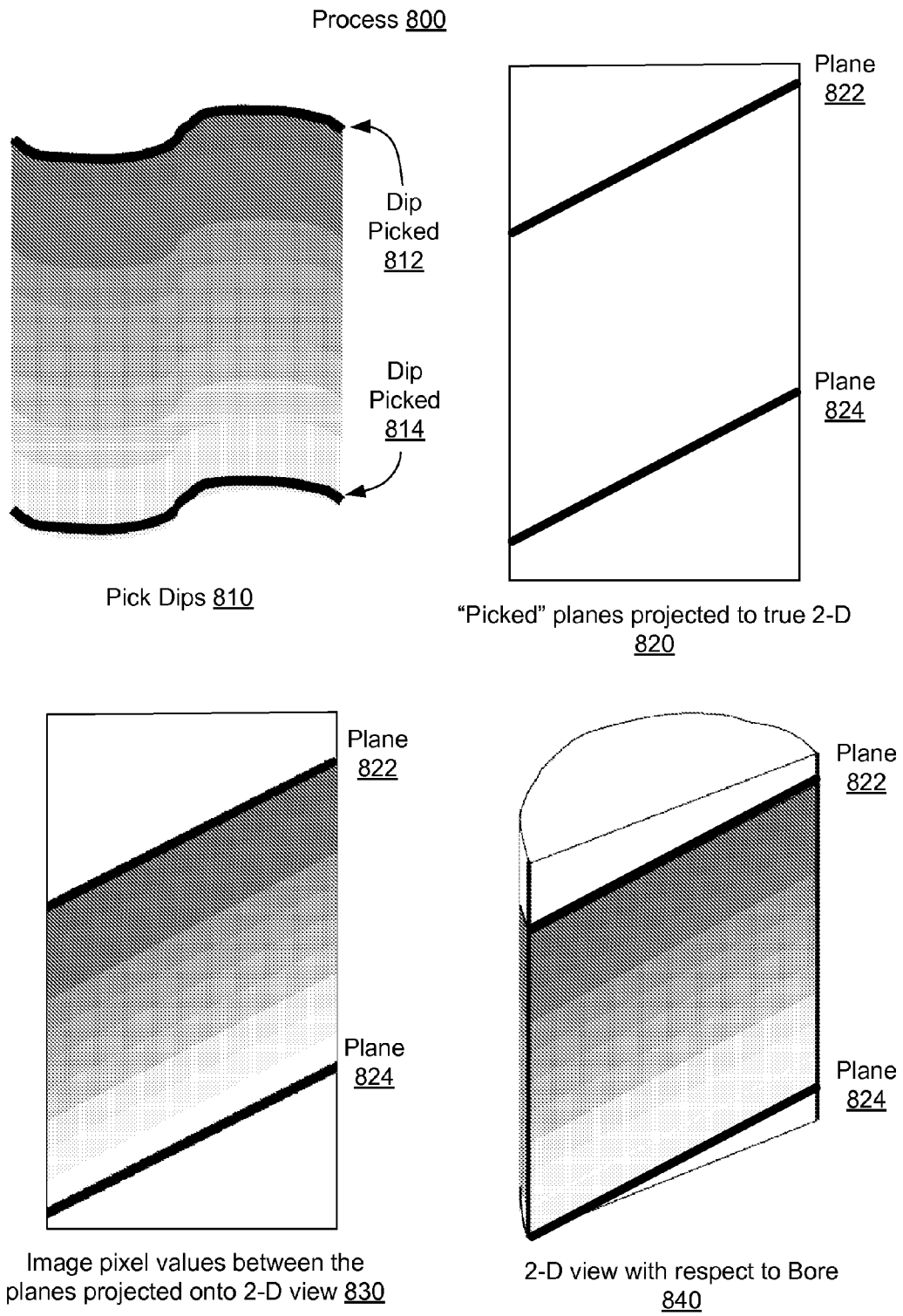
FIG. 8 illustrates an example of a process for picking dips and transforming data to a slab format.

FIG. 8 shows an example of a process 800. The process 800 includes picking dips 810 (e.g., planes) with respect to borehole data, representing the picked dips as planes 820 onto a true 2-D surface, and transforming image pixel values 830 as seen between planes 812 and 814 (see 810) onto the 2-D surface (see 830). FIG. 8 also shows a 3-D perspective view 840 of the 2-D surface with respect to the borehole. In the example of FIG. 8, an upper dip 812 and a lower dip 814 are shown as being picked. The dips 812 and 814 correspond to the planes 822 and 824 in the slab format. The image pixels between the planes 822 and 824 are derived from the data between the dips 812 and 814. As mentioned, the data between the dips 812 and 814 is surface data acquired with respect to a 3-D borehole surface (e.g., a cylindrical surface) and it must be transformed to 2-D data (e.g., to a 2-D surface that resides within the 3-D borehole).

Figure 9:
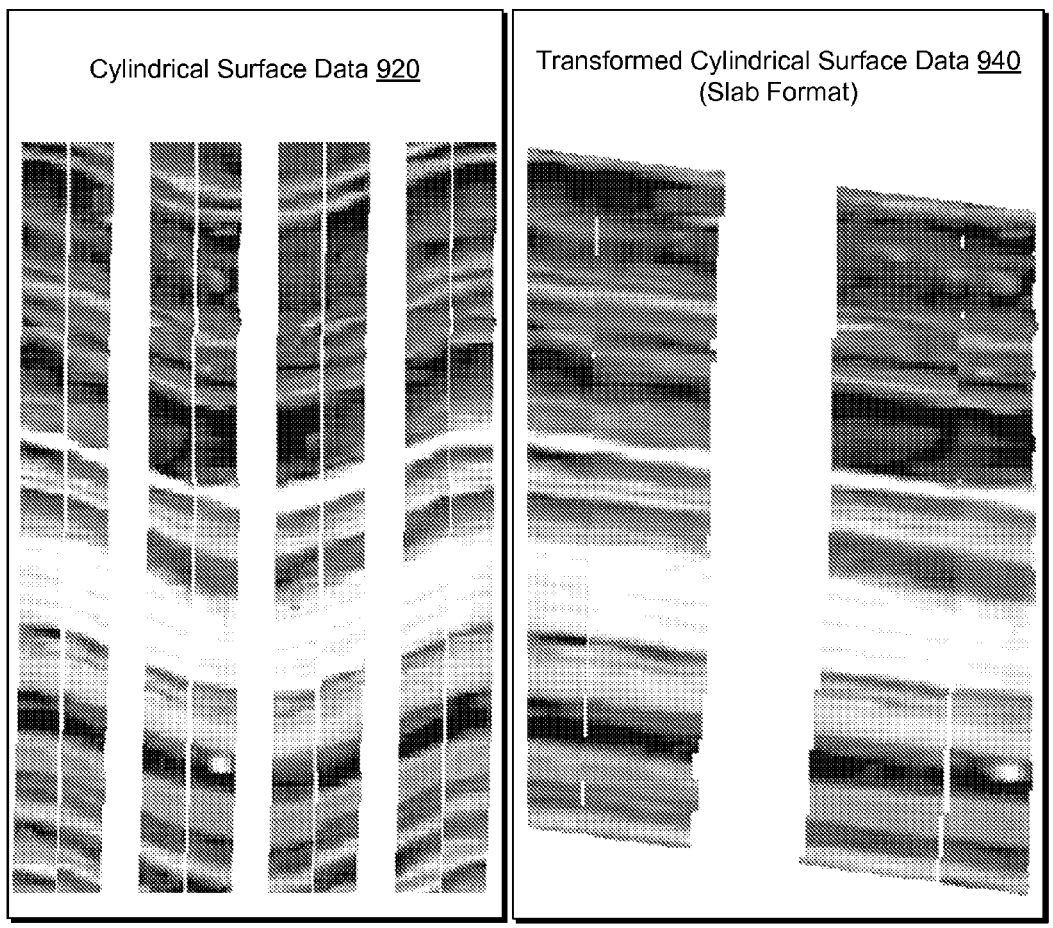
FIG. 9 illustrates an example of cylindrical surface data and transformed data in a slab format.

FIG. 9 shows an example of trial cylindrical surface data 920 and the data transformed to a slab format 940. In the example of FIG. 9, the scales of the data are not the same due to the fact that the width of the data 920 corresponds to the circumference of the borehole while the width of the data 940 corresponds to the diameter of the borehole. As an example, one or more of the scales may be selectable or adjustable. The slab format 940 presents the cylindrical surface data 920 in a manner akin to that of a solid core sample that has been cut in half, for example, parallel to a longitudinal axis (see, e.g., the cut core sample 130 of FIG. 1). Accordingly, a geologist with experience analyzing such solid core slab samples may more readily apply his/her experience to the acquired data using a borehole tool.

An exploration process may include taking a solid core sample (e.g., as a well is drilled) followed by acquiring borehole data organized with respect to a cylindrical surface. Further, a borehole may be enlarged one or more times where additional borehole data is acquired (and optionally solid annular core samples called sidewall cores). An analysis can include analyzing one or more sets of data and may include analyzing one or more solid cores (e.g., solid cylinders or solid annuli).

Figure 10:
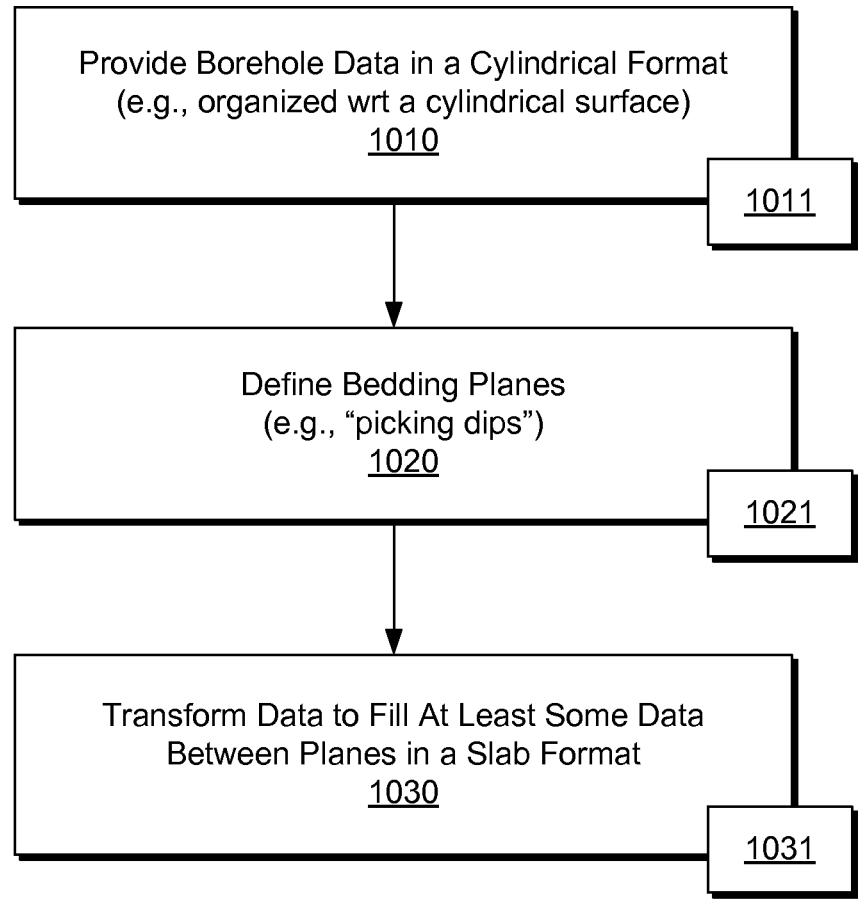
FIG. 10 illustrates an example of a method for transforming cylindrical surface data to a slab format.

FIG. 10 shows an example of a method 1000 for transforming cylindrical surface data to a slab format. The method 1000 includes a provision block 1010 for providing borehole data in a cylindrical format, a definition block 1020 (or identification block or picking block) for defining one or more bedding planes based at least in part on the provided data, a transformation block 1030 for transforming at least a portion of the provided data from the cylindrical surface data to fill in at least some data between planes in a slab format.

The method 1000 is shown in FIG. 10 in association with various computer-readable media (CRM) blocks 1011, 1021 and 1031. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1000. As an example, a computer-readable medium (CRM) may be a computer-readable storage medium.

In an example embodiment, a method can include providing borehole data organized with respect to a cylindrical surface, defining one or more bedding planes based at least in part on the borehole data, and transforming at least a portion of the borehole data to a planar slab format onto a plane interior to the cylindrical surface. In such a method, transforming can include projecting data from the cylindrical surface to the plane. As an example, the transforming can include projecting data from the cylindrical surface to the plane for regions between adjacent bedding planes.

In various examples, borehole data can include resistivity data. Such data may be acquired with respect to a cylindrical surface that corresponds to a cylindrical surface of the borehole (e.g., or a diameter of a borehole tool). In an example embodiment, a method can include comparing transformed data in a planar 2-D slab format to a solid core slab sample.

As to types of data, for example, borehole data organized with respect to a cylindrical surface can include image data and, for example, transformed borehole data may include image data. In an example embodiment, borehole data organized with respect to a cylindrical surface may be provided as pixel values.

One reason for expending substantial resources to take a core (e.g., a solid core sample) is to get a core slab for geological interpretation. A core slab provides a geologist views of material (e.g., rock, etc.) in "true" 2-D, as one would see in a road-cut or in a reference manual or as an initial step to performing a geological interpretation. As mentioned, a technique may be applied to borehole data to produce an image in a core slab format, for example, representative of an image of a "true" 2-D core slab.

In an oilfield, drilled wellbores can be imaged using various electromechanical devices. As an example, once images are acquired, they may be visualized in a particular 2-D format via a visualization technique that may be described as an "unwrapping" of the borehole image cylinder such that all planar features appear sinusoidal. Such images may optionally be displayed in one or more 3-D formats. As mentioned, a method may provide for representing borehole data in "true" 2-D in a slabbed-core-like format (e.g., slab format), for example, by projecting features into an imaginary plane parallel to the axis of the borehole and filling in "absent" data on that imaginary plane.

As an example, a process can include defining planes representing bed boundaries by "picking dips" at the bedding planes. Such a process can also include, for example, defining a direction of a section for a slab format. In such a process, the direction may be a zonable parameter (e.g., allowed to have different values as the dip changes); noting that a direction may preferably be anywhere from a direction of apparent dip to a direction perpendicular to the apparent dip.

As an example, once a section direction is defined, picked bedding planes may be used as guides in displaying a 2-D image resembling a blank core-slab for the particular orientation. In such a manner, the bedding-planes do not appear as sinusoids but rather they may appear as straight lines.

For a given sinusoidal 2-D image, dips may be picked on boundaries defined by beds (or other features, attributes, etc.) of contrasting image pixels. In such an example, the color (pixel, or other petrophysical property, value(s)) between two "picked" planes can be taken and applied between respective dip planes displayed in a 2-D imageslab. Such a process can provide a core-slab-like image with bedding planes displayed as a sequence of lines with an appropriate color scheme as determined from the borehole images. Given such an image, geologists can apply geological principles for interpretation just as would be applied for "true" 2-D core slab or images thereof.

As an example, a process can include providing a sinusoidal image (e.g., an image with one or more features appearing approximately as sinusoids), picking dips and making geological interpretations based on dip patterns and optionally some visual interpretations from the sinusoidal image. Such a process may be enhanced by transforming the sinusoidal image data into a 2-D slab format image. Alternatively, as an example, a process may include providing a sinusoidal image, picking dips and transforming the sinusoidal image data into a true 2-D slab format image for making geological interpretations and optionally some visual interpretations.

As an example, a process may include use of one or more equations to transform data. As to parameters for a cylindrical coordinate system, such equations may include a relative azimuth "azi", a sample depth "$\Delta Z$", a dip inclination "dip", a cross-section angle "XS" (e.g., in a N-E or other convention), and a radius "r".

As to the relative azimuth, "azi", as an example, this may be determined by dividing a column number of an input array by approximately 360 (e.g., 360 degrees). As to a sample depth, $\Delta Z$ (e.g., for computation made by depth), given the center of a borehole as a reference, the depth of the sample may be defined by an offset compared to a current depth at the center of the borehole. Thus, in such an example, for each column of an input array of data (e.g., from 1 to 360), at the depth Z, the position of the value can be defined by the depth offset. In this example, the depth offset is the offset between the depth where the dip is referenced (e.g., center of an ellipse corresponding to the intersection between the hole and the dip plan), and the depth of the intersection between the hole and the cylinder for each degree in N-E direction, starting at approximately 0 (e.g., 0 degrees for N).

As to the distance of a sample from a center of the borehole, which is at a radius, "r", a value may be computed at a current depth by summing a caliper and a depth of investigation of a data acquisition tool. In such an example, the radius, "r", may be defined by the following equation (1):

$$r=0.5*\text{Caliper}+\text{DOI} \tag{1}$$

where "r" is the computed radius, "Caliper" is the caliper value at the current depth and "DOI" is the depth of investigation.

As to the depth offset, $\Delta Z$, as an example, it may be computed according to equation (2) as follow:

$$\Delta Z=\tan(\text{dip})*\cos(i-\text{azi})*r \tag{2}$$

where $\Delta Z$ is the depth offset, "dip" is the dip inclination, "i" is the column number converted in degree of the input array data (e.g., image array) and "azi" is the azimuth of the dip plane.

Provided values from equations (1) and (2), position of data may be considered to be known such that determination of the position of the projected value on the cross-section may proceed.

As an example, for a new sample position, a process can be cast as a trigonometry problem where, resolution may implement the following equations (3) and (4):

$$\Delta Z\text{new}=\tan(\text{dip})*\cos(\text{azi}-XS)*x \tag{3}$$

$$x=\cos(i-XS)*r \tag{4}$$

where "$\Delta Z$ new" is a new depth offset (e.g., which can be used to determine position of the sample on the cross-section, "x"), "dip" is the dip inclination, "i" is the column number converted in degree of the input image, "azi" is the azimuth of the dip plane, "XS" is the cross-section angle in N-E convention and "r" is the radius.

As a numerical example, consider a sample as follows:
(a) the caliper ("Caliper") shows approximately 8.23 inches;
(b) the depth of investigation ("DOI") is approximately 0.394 inches;
(c) the cross-section axis ("XS") is approximately 120 degrees;
(d) the column number "i" is 200 (in degrees);
(e) the radius, r=(8.23/2)+0.394=4.509; and
(f) x=cos(200−120)*4.509=0.783.

An example embodiment may include one or more computer-readable media that include computer-executable instructions to instruct a computing system to: receive borehole data organized with respect to a cylindrical surface;

define one or more bedding planes based at least in part on the borehole data; and transform at least a portion of the borehole data to a planar slab format for a plane interior to the cylindrical surface. Such an example may include instructions to instruct a computing system to render the transformed borehole data to a display and, optionally, instructions to instruct a computing system to analyze the rendered transformed borehole data.

As an example, instructions may provide for selecting a direction of a plane interior to a cylindrical surface for purposes of transforming data to a slab format. For example, a N-S plane may be selected, an E-W plane may be selected, etc. As an example, a transformation may include projecting data from a west or an east direction to a N-S plane, projecting data from a north or a south direction to an E-W plane, etc. As an example, a transformation may include averaging data from opposite directions projected to a selected plane. For example, data may be projected from W to a N-S plane and from E to a N-S plane and then averaged to provide averaged data for the N-S plane.

An example embodiment may include a system that includes an interface to receive borehole data organized with respect to a cylindrical surface; a graphical user interface to align a sinusoidal graphic with respect to an image of the borehole data; circuitry to project at least a portion of the borehole data to a plane interior to the cylindrical surface; and circuitry to render a 2-D image of the plane where the 2-D image includes bedding planes derived from alignment of the sinusoidal graphic and projected borehole data. Such a system may include a processor (e.g., single or multi-core) and memory accessible to the processor. A system may include circuitry to analyze the 2-D image and, optionally, an interface to transmit information derived from analysis of the 2-D image (e.g., for purposes of controlling a well-related operation, an injection process, an extraction process, etc.).

Figure 11:
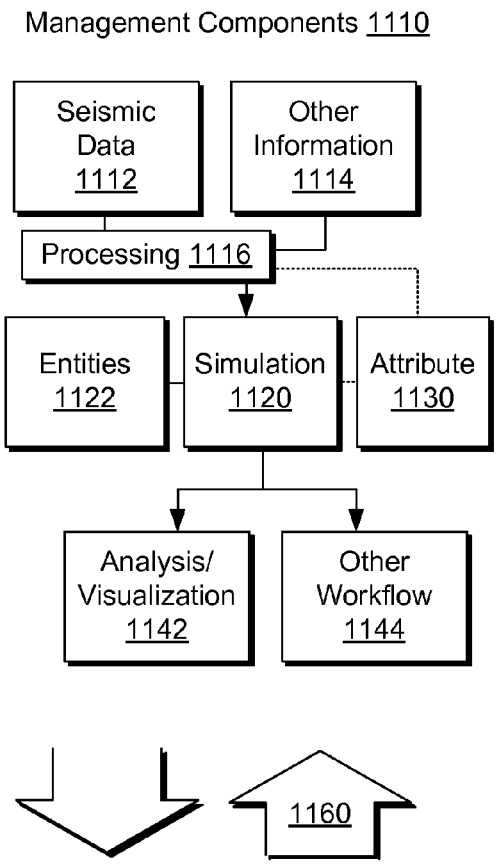
FIG. 11 illustrates an example of a system and an example of a geologic environment.
Figure 11:
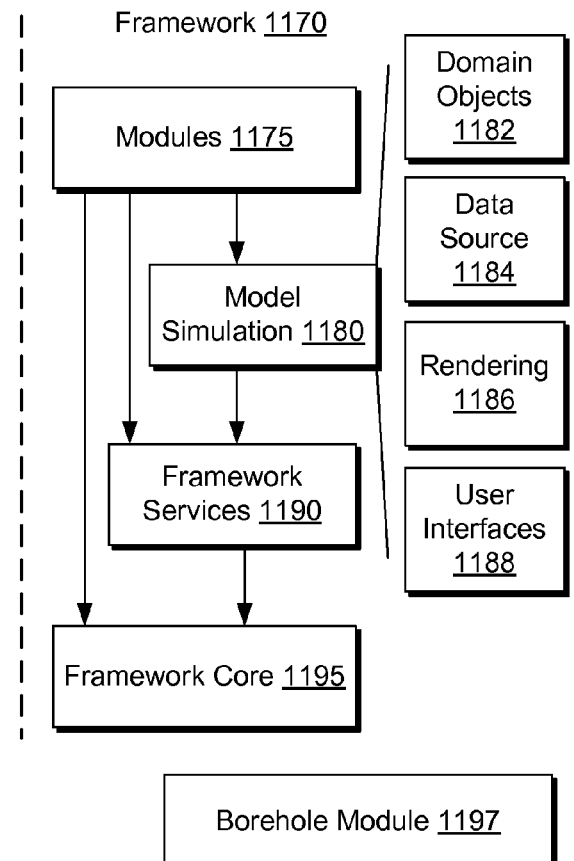
Figure 11:
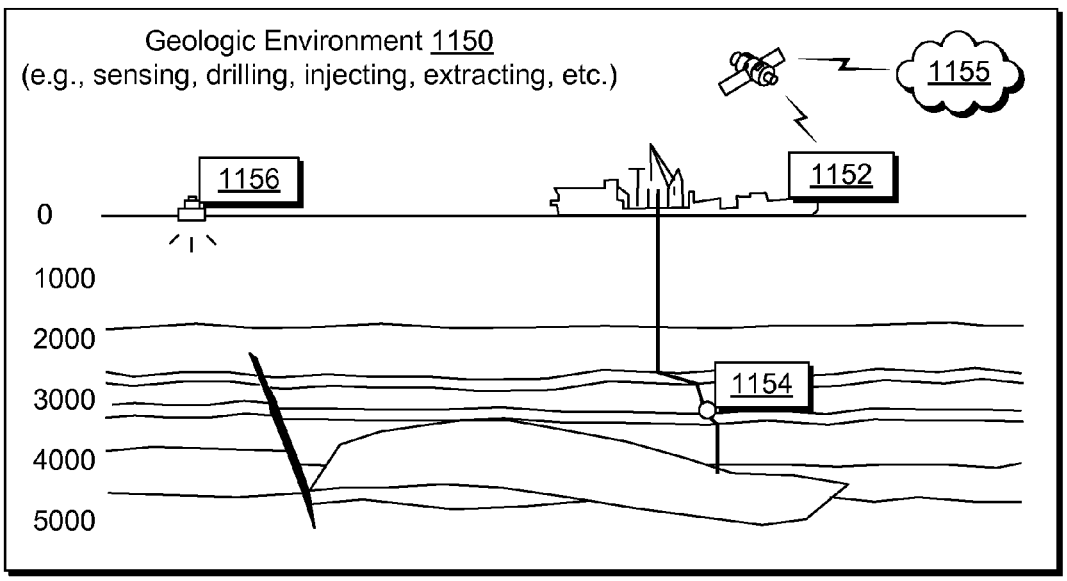

FIG. 11 shows an example of a system 1100 that includes various management components 1110 to manage various aspects of a geologic environment 1150 (e.g., an environment that includes a sedimentary basin). For example, the management components 1110 may allow for direct or indirect management of sensing, drilling, injecting, extracting, etc., with respect to the geologic environment 1150. In turn, further information about the geologic environment 1150 may become available as feedback 1160 (e.g., optionally as input to one or more of the management components 1110).

In the example of FIG. 11, the management components 1110 include a seismic data component 1112, an additional information component 1114 (e.g., well/logging data), a processing component 1116, a simulation component 1120, an attribute component 1130, an analysis/visualization component 1142 and a workflow component 1144. In operation, seismic data and other information provided per the components 1112 and 1114 may be input to the simulation component 1120.

In an example embodiment, the simulation component 1120 may rely on entities 1122. Entities 1122 may include earth entities or geological objects such as wells, surfaces, reservoirs, etc. In the system 1100, the entities 1122 can include virtual representations of actual physical entities that are reconstructed for purposes of simulation. The entities 1122 may include entities based on data acquired via sensing, observation, etc. (e.g., the seismic data 1112 and other information 1114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 1120 may rely on a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 11, the simulation component 1120 may process information to conform to one or more attributes specified by the attribute component 1130, which may include a library of attributes. Such processing may occur prior to input to the simulation component 1120 (e.g., consider the processing component 1116). As an example, the simulation component 1120 may perform operations on input information based on one or more attributes specified by the attribute component 1130. In an example embodiment, the simulation component 1120 may construct one or more models of the geologic environment 1150, which may be relied on to simulate behavior of the geologic environment 1150 (e.g., responsive to one or more acts, whether natural or artificial). In the example of FIG. 11, the analysis/visualization component 1142 may allow for interaction with a model or model-based results. As an example, output from the simulation component 1120 may be input to one or more other workflows, as indicated by a workflow component 1144.

In an example embodiment, the management components 1110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

As an example, the simulation component 1120 or one or more of the other management components 1110 may include one or more features of a simulation framework such as, for example, the ECLIPSE® framework (Schlumberger Limited, Houston, Tex.), the INTERSECT® framework (Schlumberger Limited, Houston, Tex.), etc.

In an example embodiment, various aspects of the management components 1110 may include add-ons or plug-ins that operate according to specifications of a framework environment. For example, a commercially available framework environment marketed as the OCEAN® framework environment (Schlumberger Limited, Houston, Tex.) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 11 also shows an example of a framework 1170 that includes a model simulation layer 1180 along with a framework services layer 1190, a framework core layer 1195 and a modules layer 1175. The framework 1170 may include the commercially available OCEAN® framework where the model simulation layer 1180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 1180 may provide domain objects 1182, act as a data source 1184, provide for rendering 1186 and provide for various user interfaces 1188. Rendering 1186 may provide a graphical environment in which applications can display their data while the user interfaces 1188 may provide a common look and feel for application user interface components.

In the example of FIG. 11, the domain objects 1182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 11, data may be stored in one or more data sources (or data stores, generally physical data storage devices), which may be at the same or different physical sites and accessible via one or more networks. The model simulation layer 1180 may be configured to model projects. As such, a particular project may be stored where stored project information may include inputs, models, results and cases. Thus, upon completion of a modeling session, a user may store a project. At a later time, the project can be accessed and restored using the model simulation layer 1180, which can recreate instances of the relevant domain objects.

In the example of FIG. 11, the geologic environment 1150 may be outfitted with any of a variety of tools, sensors, detectors, actuators, etc. For example, equipment 1152 may include communication circuitry to receive and to transmit information with respect to one or more networks 1155. Such information may include information associated with downhole equipment 1154, which may be equipment to acquire information, to assist with resource recovery, etc. Other equipment 1156 may be located remote from a well site and include sensing, detecting, emitting or other circuitry. Such equipment may include storage and communication circuitry to store and to communicate data, instructions, etc.

In the example of FIG. 11, a borehole module 1197 may be provided, for example, to analyze borehole data. Such a module may include instructions to generate data in a slab format based on cylindrical data such as cylindrical surface data. For example, the downhole equipment 1154 may be configured to acquire cylindrical surface data of a borehole. As an example, the acquired data may be communicated uphole to the equipment 1152 and processed using the borehole module 1197, optionally in conjunction with one or more other modules (e.g., executable by a computing system). As an example, such processing may provide information germane to a drilling or other operation. For example, the equipment 1154 may include drilling equipment where processing of the cylindrical surface data provides near-real-time slab format images for interpretation and decision making as to control of the drilling equipment.

As an example, the borehole module 1197 may be a module of an analysis framework such as, for example, the TECHLOG® analysis framework. As an example, an OCEAN® framework plug-in may be provided that allows interaction between the PETREL® framework and the TECHLOG® analysis framework. In such an example, the borehole module 1197 may provide analysis results that can be communicated to the PETREL® framework. As an example, such results may include borehole images, dip (e.g., angle, azimuth, etc), etc. As an example, the PETREL® framework may refine a model of a geologic environment, for example, for purposes of simulation, etc.

Figure 12:
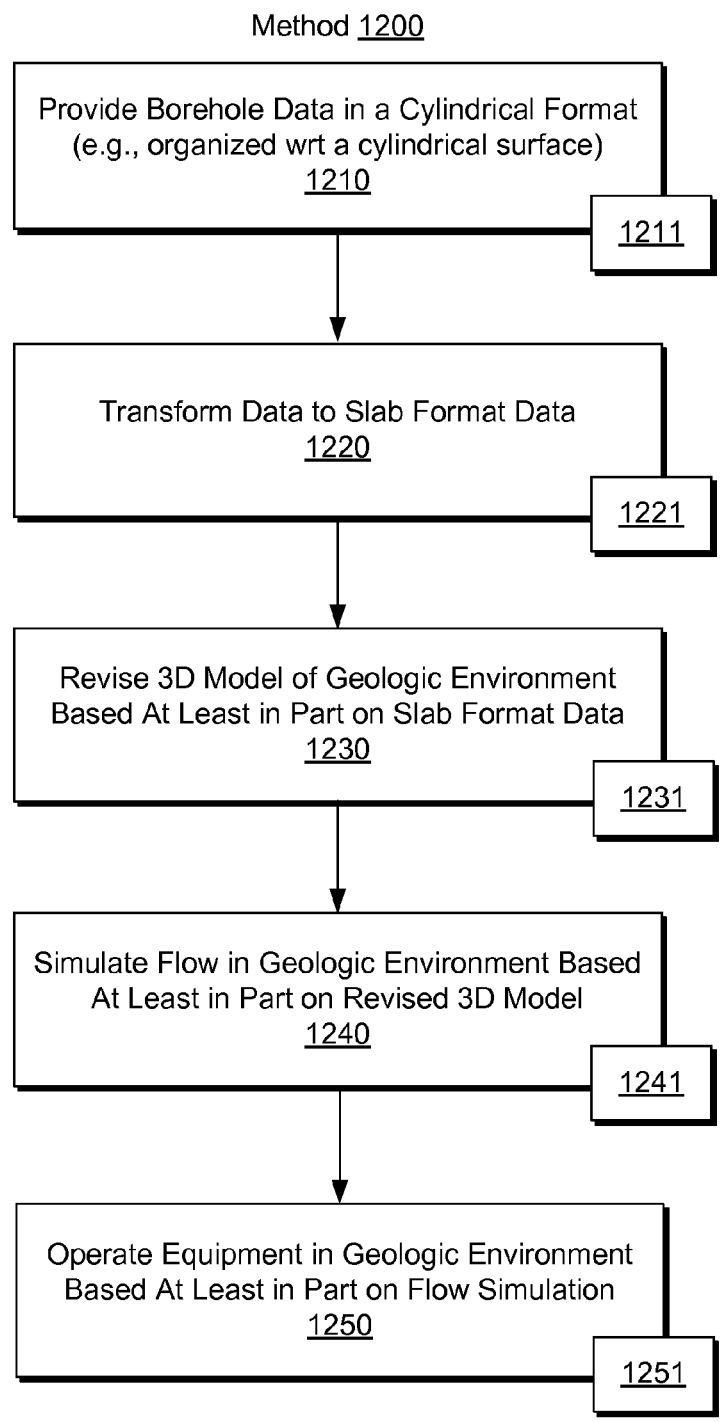
FIG. 12 illustrates an example of a method.

FIG. 12 shows an example of method 1200 that includes a provision block 1210 for providing borehole data in a cylindrical format for a borehole in a geologic environment, a transformation block 1220 for transforming at least a portion of the provided data from cylindrical surface data to slab format data, a revision block 1230 to revise a 3-D model of the geologic environment based at least in part on the slab format data, a simulation block 1240 for simulating flow of fluid in the geologic environment, and an operation block 1250 for operating equipment in the geologic environment based at least in part on the flow simulation.

As an example, a tool may be deployed in a borehole to acquire borehole data in a cylindrical format (e.g., cylindrical surface data), such data may be stored, communicated or otherwise provided for access by a computing system configured to transform borehole data in a cylindrical format to slab format data (e.g., optionally as one or more images). In such an example, the computing system may be configured for executing a framework such as the TECHLOG® analysis framework where a module includes instructions for performing the transformation. As an example, a framework such as the PETREL® framework may receive transformed data or results based on transformed data (e.g., dips, etc.) and revise a 3-D model (e.g., a grid, properties, etc.). As an example, a framework such as the INTERSECT® framework may simulate flow in a geologic environment based at least in part on a 3-D model of the PETREL® framework, for example, where the 3-D model has been generated, revised, etc. based at least in part on borehole data transformed from a cylindrical format to a slab format. As an example, a controller may be programmed to operate equipment positioned in a geologic environment (e.g., drilling equipment, enhanced oil recovery equipment, etc.).

The method 1200 is shown in FIG. 12 in association with various computer-readable media (CRM) blocks 1211, 1221, 1231, 1241 and 1251. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1200. As an example, a computer-readable medium (CRM) may be a computer-readable storage medium.

The term "circuit" or "circuitry" can include all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Circuitry can include one or more computer-readable media that include computer-executable instructions to instruct a computer to perform one or more actions. The term "computer-executable instructions" includes processor-executable instructions, whether a processor is a central processor, a graphics processor or other type of processor. Instructions stored on a computer-readable medium may be software (e.g., instructions for telling a computer, computing device, etc., what to do and how to do it). A computer-readable medium may be a storage device such as memory, an optical storage device, etc. Such a storage device may store instructions and optionally other information (e.g., data, etc.) in a non-transitory manner.

Figure 13:
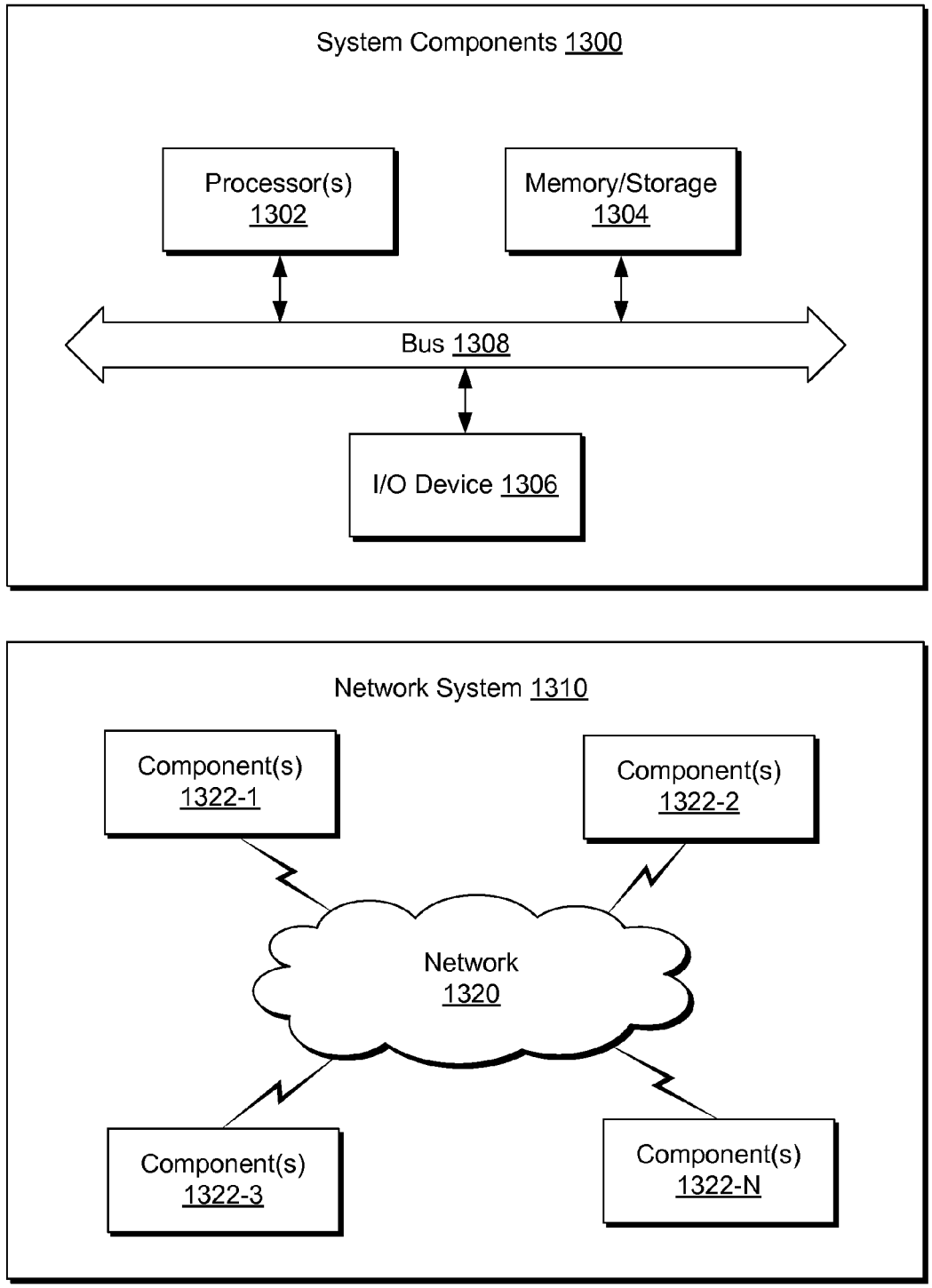
FIG. 13 illustrates example components of a system and a networked system.

FIG. 13 shows components of an example of a computing system 1300 and an example of a networked system 1310. The system 1300 includes one or more processors 1302, memory and/or storage components 1304, one or more input and/or output devices 1306 and a bus 1308. In an example embodiment, instructions may be stored in one or more computer-readable media (e.g., memory/storage components 1304). Such instructions may be read by one or more processors (e.g., the processor(s) 1302) via a communication bus (e.g., the bus 1308), which may be wired or wireless. The one or more processors may execute such instructions to implement (wholly or in part) one or more attributes (e.g., as part of a method). A user may view output from and interact with a process via an I/O device (e.g., the device 1306). In an example embodiment, a computer-readable medium may be a storage component such as a physical memory storage device, for example, a chip, a chip on a package, a memory card, etc.

In an example embodiment, components may be distributed, such as in the network system 1310. The network system 1310 includes components 1322-1, 1322-2, 1322-3, . . . 1322-N. For example, the components 1322-1 may include the processor(s) 1002 while the component(s) 1322-3 may include memory accessible by the processor(s) 1302. Further, the component(s) 1302-2 may include an I/O device for display and optionally interaction with a method. The network may be or include the Internet, an intranet, a cellular network, a satellite network, etc.

CONCLUSION

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A method comprising:
   providing borehole data organized with respect to a cylindrical surface;
   defining one or more bedding planes based at least in part on the borehole data; and
   transforming at least a portion of the borehole data to a planar slab format for a plane interior to the cylindrical surface.

2. The method of claim 1 wherein the transforming comprises projecting data from the cylindrical surface to the plane.

3. The method of claim 1 wherein the transforming comprises projecting data from the cylindrical surface to the plane for regions between adjacent bedding planes.

4. The method of claim 2 wherein the projecting comprises projecting data from the cylindrical surface to the plane for multiple azimuthal directions.

5. The method of claim 1 wherein the transforming comprises representing defined bedding planes onto a 2-D surface.

6. The method of claim 1 comprising applying corrections to reduce effects on data quality during projection.

7. The method of claim 1 wherein the borehole data comprises resistivity data, or any other petrophysical measurement.

8. The method of claim 1 wherein the cylindrical surface corresponds to a cylindrical surface of the borehole.

9. The method of claim 1 comprising comparing the transformed data in the planar slab format to a cross-section of a solid core sample.

10. The method of claim 1 wherein the borehole data organized with respect to a cylindrical surface comprises image data.

11. The method of claim 1 wherein the transformed borehole data comprises image data.

12. The method of claim 1 wherein the borehole data organized with respect to a cylindrical surface comprises pixel values or petrophysical values.

13. One or more non-transitory computer-readable storage media comprising computer-executable instructions to instruct a computing system to:
   receive borehole data organized with respect to a cylindrical surface;
   define one or more bedding planes based at least in part on the borehole data; and
   transform at least a portion of the borehole data to a planar slab format for a plane interior to the cylindrical surface.

14. The one or more computer-readable storage media of claim 13 comprising computer-executable instructions to instruct a computing system to render the transformed borehole data to a display.

15. The one or more computer-readable storage media of claim 14 comprising computer-executable instructions to instruct a computing system to analyze the rendered transformed borehole data.

16. The one or more computer-readable storage media of claim 14 comprising computer-executable instructions to instruct a computing system to select a direction for the plane interior to the cylindrical surface.

17. A system comprising:
   an interface to receive borehole data organized with respect to a cylindrical surface;
   a graphical user interface to align a sinusoidal graphic with respect to an image of the borehole data;

circuitry to project at least a portion of the borehole data to a plane interior to the cylindrical surface; and circuitry to render a 2-D image of the plane wherein the 2-D image comprises a planar slab format comprising bedding planes derived from alignment of the sinusoidal graphic and projected borehole data.

18. The system of claim 17 comprising circuitry to analyze the 2-D image.

19. The system of claim 18 comprising an interface to transmit information derived from analysis of the 2-D image.

* * * * *